US008673481B2

(12) United States Patent
Chen

(10) Patent No.: US 8,673,481 B2
(45) Date of Patent: Mar. 18, 2014

(54) BATTERY SYSTEM

(76) Inventor: Gang Chen, Richmond (CA)

( * ) Notice: Subject to any disclaimer, the term of this patent is extended or adjusted under 35 U.S.C. 154(b) by 470 days.

(21) Appl. No.: 12/400,785

(22) Filed: Mar. 9, 2009

(65) Prior Publication Data

US 2010/0035134 A1 Feb. 11, 2010

Related U.S. Application Data

(60) Provisional application No. 61/035,125, filed on Mar. 10, 2008.

(51) Int. Cl.
H01M 2/00 (2006.01)
H01M 2/10 (2006.01)
H01M 6/00 (2006.01)
H01M 10/00 (2006.01)
H01M 2/08 (2006.01)
H01M 2/04 (2006.01)
H01M 2/02 (2006.01)

(52) U.S. Cl.
USPC .............. 429/163; 429/96; 429/97; 429/100; 429/122; 429/174; 429/175; 429/176; 429/178; 429/179; 429/180; 429/182; 429/183; 429/184; 429/185; 429/186; 429/187; 439/500; 439/627

(58) Field of Classification Search
USPC ............ 429/96, 97, 100, 122, 163, 174, 175, 429/176, 178, 179, 180, 182, 183, 184, 185, 429/186, 187; 439/500, 627
See application file for complete search history.

(56) References Cited

U.S. PATENT DOCUMENTS

| 4,931,369 | A | * | 6/1990 | Hardt et al. ...................... 429/98 |
| 5,586,907 | A | | 12/1996 | Frantz et al. |
| 5,931,693 | A | | 8/1999 | Yamazaki |
| 6,733,327 | B2 | * | 5/2004 | Sugimoto et al. ............. 439/500 |
| 6,965,544 | B2 | | 11/2005 | Watanabe et al. |
| 2008/0102691 | A1 | * | 5/2008 | Darr .............................. 439/500 |

FOREIGN PATENT DOCUMENTS

| EP | 0407966 B1 | 1/1991 |
| JP | 06267521 A2 | 9/1994 |
| JP | 2006331715 A2 | 12/2006 |
| WO | 2007/033670 A2 | 3/2007 |

OTHER PUBLICATIONS

Real Dictionary: Transverse (Princeton University, Princeton NJ USA, © 2001 Available May 26, 2003 {http://www.realdictionary.com/?q=transverse}).*

* cited by examiner

Primary Examiner — Patrick Ryan
Assistant Examiner — Aaron Greso

(57) ABSTRACT

A housing (610, 620) for a button-type battery (β) includes a cavity with resilient conductive terminals (300, 400) therein and a door (500) opposite the terminals (300, 400).
When a battery (β) is pushed inside the cavity and the door (500) is moved to its closed position, the resilient terminals (300, 400) hold the battery (β) in place, applying a force urging the battery (β) against the door (500) to better maintain electrical contact.
When the door (500) is moved to its open position, the resilient terminals (300, 400) push the battery (β) at least one fifth of its diameter out of the cavity, so a user can pull out the battery (β) by hand and change the battery (β) easily.

1 Claim, 7 Drawing Sheets

BATTERY SYSTEM

BACKGROUND

1. Field

The present invention is directed to an apparatus for housing a button-type battery, and more particularly to an apparatus that facilitates compact housing and easy changing of the battery.

2. Description of Related Art

Miniature electronic equipment is often portable in nature and, as such, requires a portable source of power such as a button-type battery. A battery may be conveniently attached to the housing of miniature electronic equipment and make electrical contact by way of a conventional connector. To make battery changing easier, battery housing and locking mechanisms have been devised to enable the user to disconnect a spent battery and replace it with a freshly charged battery. It has been proven desirable to securely affix the detachable battery to the miniature electronic equipment by way of some sort of housing and locking mechanism. As the equipment becomes smaller, however, space within the miniature electronic equipment cannot be afforded for extensive locking mechanisms separately. Thus, it would be advantageous for housing and locking mechanisms to be integrated together within the miniature electronic equipment.

Traditional button battery housings are of a drawer-like cartridge structure in nature, which has the disadvantage of increased thickness for miniature electronic equipment. The button battery dwells in the cartridge in the form of a drawer, which is thick. When changing the battery, a user pulls the drawer cartridge out of or pushes the drawer cartridge in to the equipment and then takes out the battery from the cartridge. Another disadvantage is there exist separate parts from the equipment—like the drawer cartridge—which can be easily lost when a user changes the battery.

SUMMARY OF THE INVENTION AND ADVANTAGES

The present invention is directed to these problems, integrating a battery housing, a door and resilient conductive terminals that cooperate to retain a button battery in place during use and to eject the batter from the housing for changing.

In general terms, when a user simply moves the battery door into its open position, the battery automatically jumps out of the housing, by at least one fifth of the diameter of the battery, under the urging of the resilient terminals. The user presses a new battery into battery slot in the housing and moves the door into its closed position to lock the battery in the housing.

The door may slide between its open position and closed position, being guided in transit along grooves inside the housing so the door is always connected with the housing and will not be lost.

More particularly, one aspect of the invention provides an apparatus for housing a button-type battery having respective negative and positive poles, the apparatus including:

a housing with a cavity adapted to receive and releasably retain the battery, the cavity projecting a slot in a face of the housing through which the battery may enter and leave;

a door, movably mounted to the housing and operable to move between a closed position covering the slot and an open position uncovering the slot; and a connector within the cavity, the connector having a negative terminal and a positive terminal adapted for respective electrical connection to the negative and positive poles of the battery, the connector being operable to urge the battery against the door when the door is in the closed position and to urge the battery partially through the slot when the door is in the open position.

In this regard, there is provided an integral structure for housing a battery. Resilient, conductive connectors, for example including metal clips, function both as electrical terminals and a battery holder within the housing, this battery holder also serving to urge the battery out of the housing when changing is desired. In this way, the battery may be ejected, for example one fifth of its diameter, from the housing. In regular operation, the resilient connectors continually apply force to the battery to maintain a good and reliable electrical connection.

Accordingly, these and other objects are realized in the present invention, which encompasses a unique battery housing having cooperating door and resilient conductive terminals to enable easy installation and removal of the battery.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF SPECIFIC EMBODIMENTS

Figure 1:
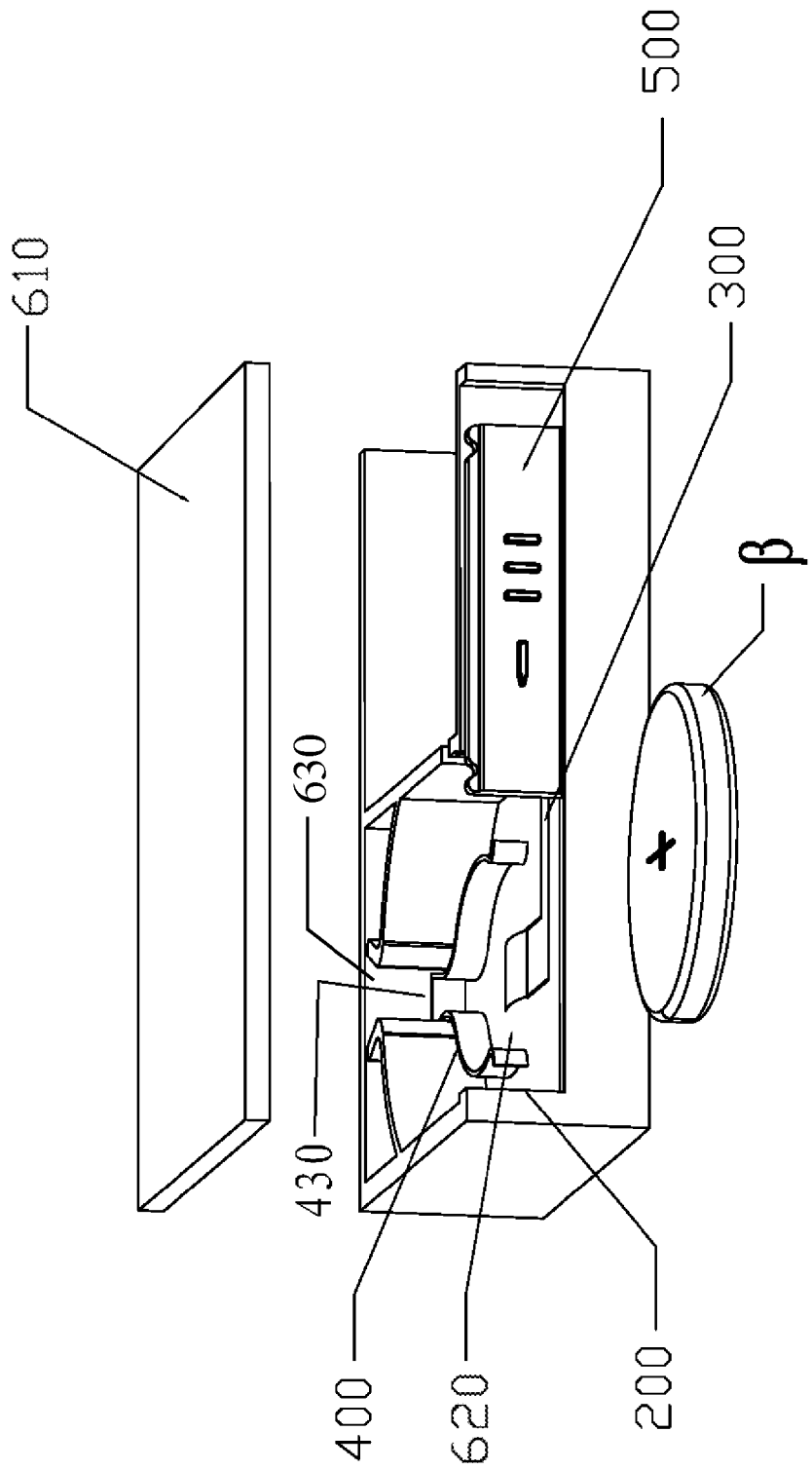
FIG. 1 is a perspective view of a battery housing according to one embodiment of the present invention.
Figure 2:
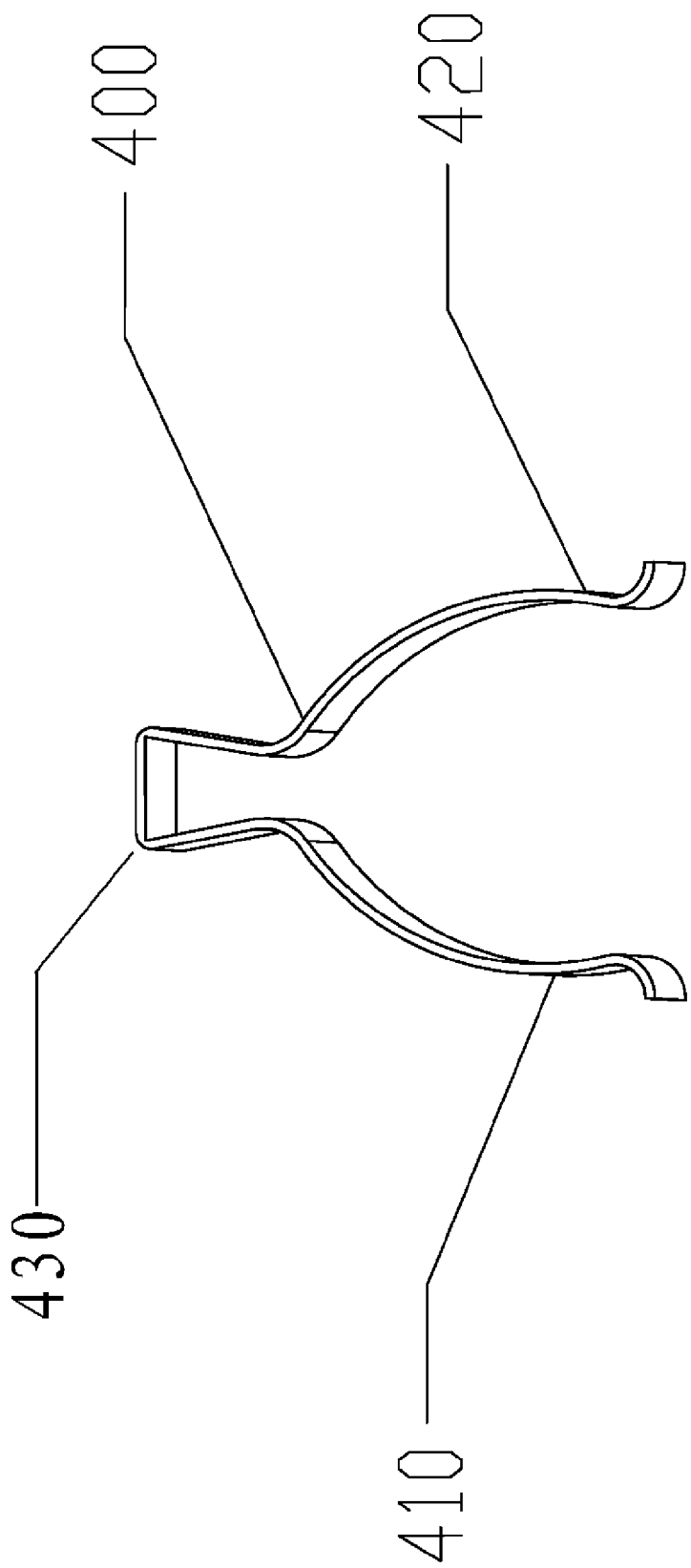
FIG. 2 is a perspective view of a positive terminal within the housing of FIG. 1.
Figure 3:
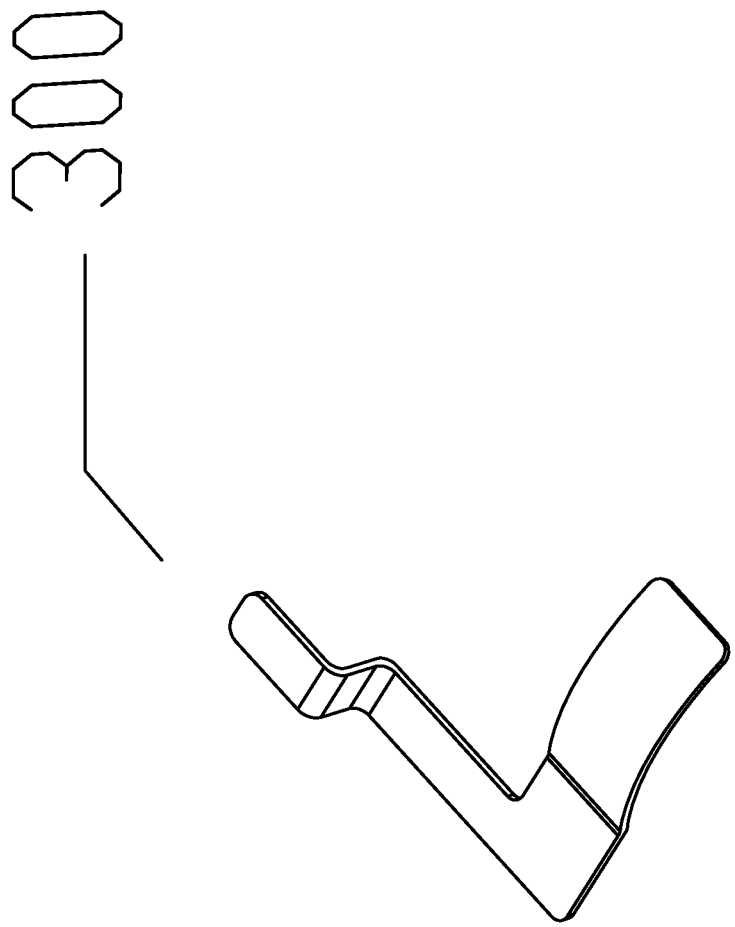
FIG. 3 is a perspective view of a negative terminal within the housing of FIG. 1.
Figure 4:
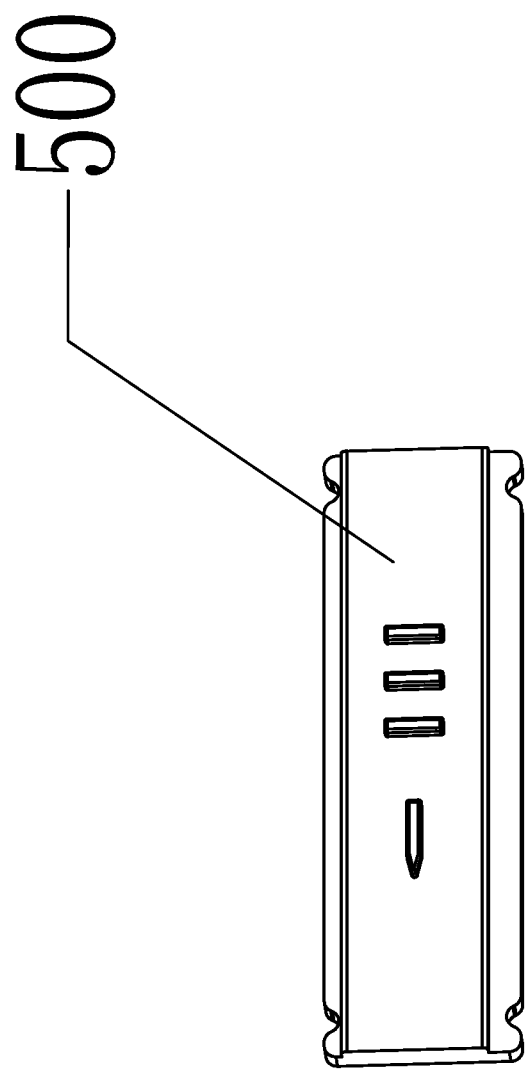
FIG. 4 is a perspective view of the battery door movably connected to the housing of FIG. 1.
Figure 5:
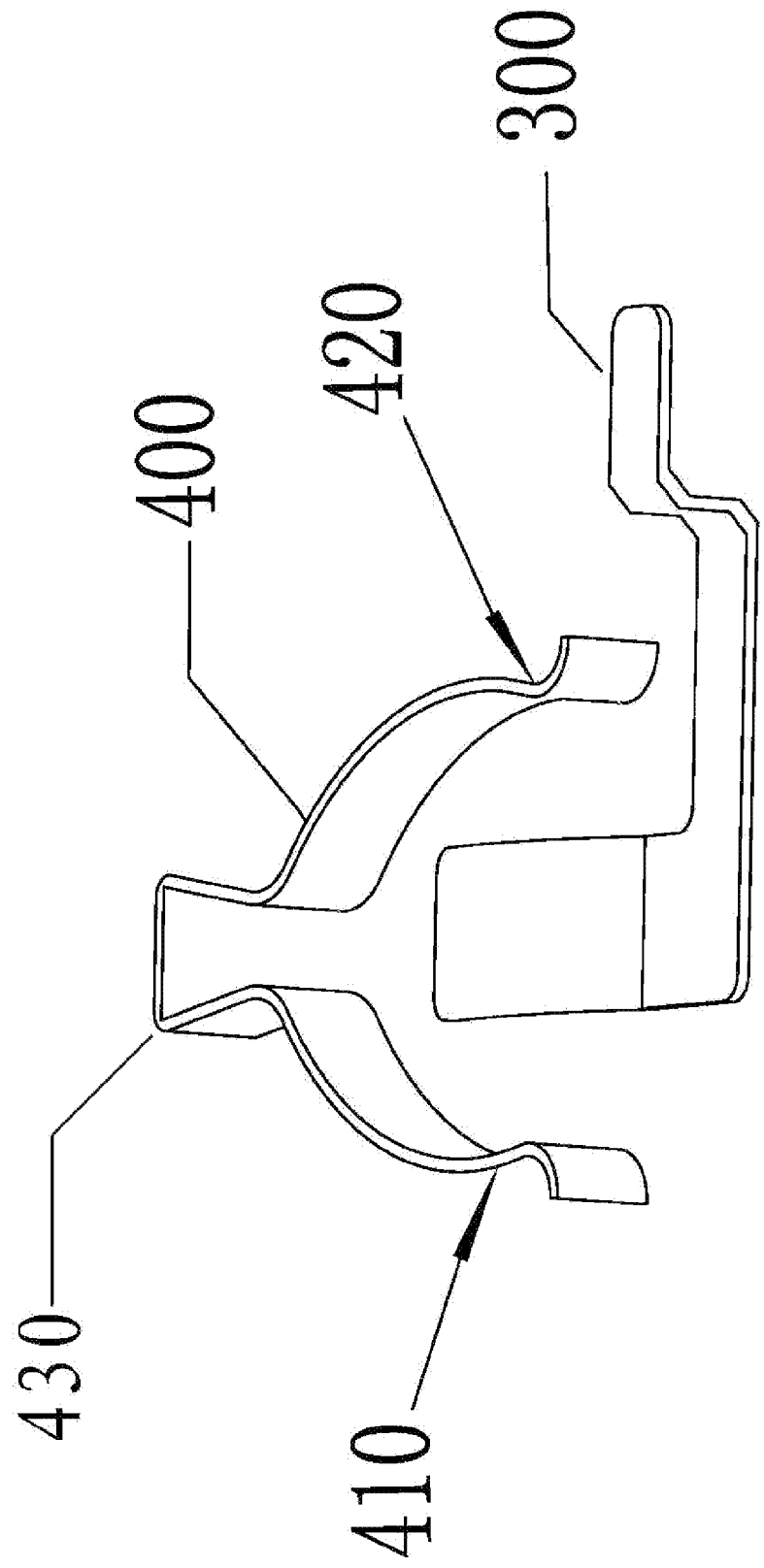
FIG. 5 is a perspective view of the relative position of the positive terminal and the negative terminal with the battery removed.
Figure 6:
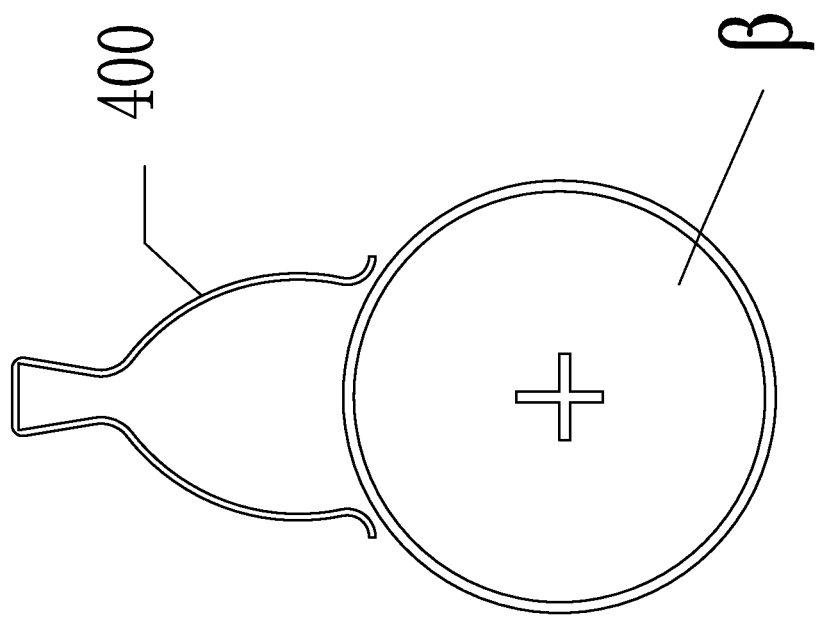
FIG. 6 is a plan view of positive terminal and the battery in relative disposition with the door open.
Figure 7:
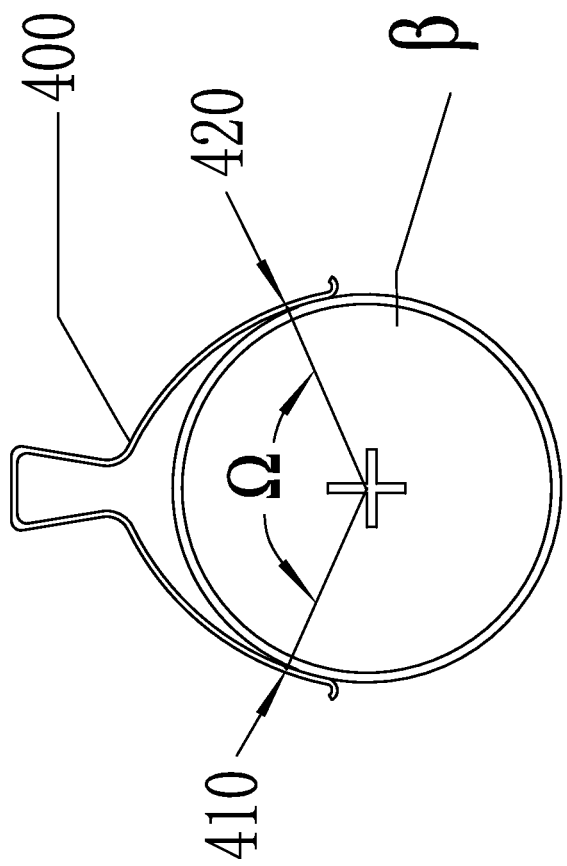
FIG. 7 is a plan view of the positive terminal and the battery in relative disposition with the door closed.

Referring to the Figures, wherein like numerals indicate corresponding parts throughout the several views, FIG. 1 shows an apparatus for housing a button-type battery β (not part of the invention) having respective negative and positive poles.

The apparatus includes a housing 610, 620 having a cavity adapted to receive and releasably retain the battery β, the cavity projecting a slot 200 in a face of the housing 610, 620 through which the battery β may enter and leave. To ease manufacturing or use, the housing 610, 620 may be formed as a complementary upper housing 610 and lower housing 620, as illustrated.

The apparatus also includes a door 500, slidably mounted to the housing 610, 620 and operable to slide transversely to the slot 200 between a closed position covering the slot 200 and an open position uncovering the slot 200. In the embodiment illustrated, the door 500 is mounted for sliding movement with respect to the housing 610, 620; however, other movements, for example rotational movement, could also work well. Those skilled in the art will recognize that in movement between the open and closed positions, the illustrated embodiment of the door 500 remains permanently connected to the housing 610, 620, to reduce the risk the door 500 will become lost. This arrangement is desirable but not necessary.

The apparatus further includes a connector 300, 400, within the cavity opposite the slot 200, the connector 300, 400 having a negative terminal 300 and a positive terminal 400 adapted for respective electrical connection to the negative and positive poles of the battery β, the connector 300, 400 being operable to urge the battery β against the door 500 when the door 500 is in the closed position and to urge the battery β partially out of the slot 200 when the door 500 is in the open position. In the illustrated embodiment, the connector 300, 400 is mounted to the lower housing 620 at the vertex 430. The lower housing 620 includes a notch 630 opposite the slot 200, which is configured to engage the exterior of the vertex 430 to retain the connector 300, 400 within the lower housing 620 opposite the slot 200.

The connector 300, 400 may include a clip having a vertex 430 and resilient opposing first and second arms 410, 420 that extend from the vertex 430, the first and second arms 410, 420 being adapted to abut the battery β at respective first and second portions of its perimeter and operable to apply a pinching force proximate a diameter of the battery β between them to improve electrical contact, the component of the pinching force normal to the slot 200 being sufficient to also urge the battery β away from the connector 300, 400 and toward the slot 200. The vertex 430 may be a truncated ∇-shape, as illustrated.

In this regard, it will be seen that the first and second arms 410, 420 are operable to apply the pinching force to a convex portion of the battery β perimeter between the first and second portions, such that the first and second arms 410, 420 urge the battery β away from the connector 300, 400 and toward the slot 200. More generally, the first and second arms 410, 420 are operable to apply the pinching force to a proximate portion of the battery β perimeter within the semiperimeter opposite the slot 200, such that the first and second arms 410, 420 urge the battery β away from the connector 300, 400 and toward the slot 200.

The clip can be part of either the negative terminal 300 or the positive terminal 400. In the embodiment illustrated, it is part of the positive terminal 400.

Desirably, the first and second arms 410, 420 are operable to urge one fifth of the battery β through the slot 200 when the door 500 is in the open position.

In operation, a user changes a battery β as follows. First he moves the door 500 to its open position, allowing the resilient connector 300, 400 to push the old battery β out of the housing 610, 620 through the slot 200, for example one fifth of its diameter. With that much of the old battery β exposed, the user can easily grasp the old battery β and completely remove it from the housing 610, 620. The user then inserts a new battery β' into the housing 610, 620 through the slot 200, pushing the new battery β' all the way in against the urging of the resilient connector 300, 400. When the new battery β' has cleared the slot 200 and resides completely within the housing 610, 620, the user moves the door 500 to its closed position. The resilient connector 300, 400 then secures the new battery β' within the housing 610, 620, urging it against the door 500 to hold it in place and to make good electrical connection with the terminals 300, 400.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The reference numerals in the claims are merely for convenience and are not to be read in any way as limiting.

ELEMENT LIST

| Element Symbol | Element Name |
| --- | --- |
| 200 | slot |
| 300 | negative terminal |
| 400 | positive terminal |
| 410 | first arm |
| 420 | second arm |
| 430 | vertex |
| 500 | door |
| 610 | upper housing |
| 620 | lower housing |
| 630 | notch |
| β | battery |

What is claimed is:

1. An apparatus for housing a button-type battery β having respective negative and positive poles, comprising:
    a housing (610, 620) having a cavity adapted to receive and releasably retain the battery β, the cavity projecting a slot (200) in a face of the housing (610, 620) through which the battery β may enter and leave;
    a door (500), slidably mounted to the housing (610, 620) and operable to slide transversely to the slot (200) between a closed position covering the slot (200) and an open position uncovering the slot (200);
    a connector (300, 400) within the cavity opposite the slot (200), the connector (300, 400) having a negative terminal (300) and a positive terminal (400) adapted for respective electrical connection to the negative and positive poles of the battery β, the connector (300, 400) being operable to urge the battery β against the door (500) when the door (500) is in the closed position and to urge the battery β partially out of the slot (200) when the door (500) is in the open position;
    wherein the connector (300, 400) includes a clip having a vertex (430) and resilient opposing first and second arms (410, 420) that extend from the vertex (430), the first and second arms (410, 420) being adapted to abut the battery β at respective first and second portions on a convex portion of its perimeter and operable to apply a pinching force proximate a diameter of the battery β between them, the component of the pinching force normal to the slot (200) being sufficient to urge the battery β away from the connector (300, 400) and toward the slot (200),
    wherein the clip is part of either the negative terminal (300) or the positive terminal (400),
    wherein the vertex (430) is a truncated ∇-shape, and
    wherein the housing (610, 620) includes a lower housing (620) that includes a notch (630) opposite the slot (200), which notch is configured to engage the exterior of the vertex (430) to retain the connector (300, 400) within the lower housing (620) opposite the slot (200).

* * * * *